United States Patent [19]

Ochiai et al.

[11] Patent Number: 4,671,782
[45] Date of Patent: Jun. 9, 1987

[54] COOLER FOR A BELT TYPE STAGELESS TRANSMISSION

[75] Inventors: Hideo Ochiai, Tokyo; Akira Shigihara, Saitama; Takashi Ohyama, Tokyo, all of Japan

[73] Assignee: Honda Giken Kogyo Kabushiki Kaisha, Tokyo, Japan

[21] Appl. No.: 738,676

[22] Filed: May 28, 1985

[30] Foreign Application Priority Data

May 28, 1984 [JP] Japan .............................. 59-78130[U]
May 28, 1984 [JP] Japan .............................. 59-78131[U]

[51] Int. Cl.$^4$ .......................................... F16H 57/04
[52] U.S. Cl. .................................................... 474/93
[58] Field of Search ................ 474/93, 144, 146, 149, 474/150, 13; 74/606 A; 180/229

[56] References Cited

U.S. PATENT DOCUMENTS 4,493,677 1/1985 Ikenoya .................................. 474/93
4,531,928 9/1985 Ikendya .................................. 474/93

FOREIGN PATENT DOCUMENTS 0109762 6/1983 Japan .
137663 8/1983 Japan ..................................... 474/93
0048308 8/1983 Japan .
9365 1/1984 Japan ..................................... 474/93
54856 3/1984 Japan ..................................... 474/93
59-54856 3/1984 Japan .

Primary Examiner—Stephen J. Novosad
Assistant Examiner—Thuy M. Bui
Attorney, Agent, or Firm—Lyon & Lyon

[57] ABSTRACT

A cooler for a belt type stageless transmission in a vehicle in which a transmission casing is provided on one side of an engine body, and a belt type stageless transmission for operatively connecting between a crank shaft of the engine body and an output shaft supported in the transmission casing is housed in the transmitted casing, wherein a centrifugal fan for sucking the open air into the transmission casing is provided on either one of a pair of pulley halves of a variable diameter pulley of the transmission and an axial flow fan for guiding the sucked-in open air in the axial direction of the variable diameter pulley is provided on the other pulley half; wherein an air intake port is opened in the front portion of the transmission casing in the vicinity of the centrifugal fan and an air exhaust port is in the rear portion of the transmission casing, and a guide plate for guding the air flowing along the lower surface of the transmission casing so as to peel it off from the lower surface is further provided on the rear portion of the transmission casing below the air exhaust port; and further wherein an air passage through which the running air can flow is defined between the engine body and the transmission casing.

13 Claims, 10 Drawing Figures

COOLER FOR A BELT TYPE STAGELESS TRANSMISSION

BACKGROUND OF THE INVENTION

1. Field of the Invention

The field of the invention relates to a cooler for a belt type stageless transmission, which is used in a power unit of vehicles such as motorcycles.

2. Description of the Prior Art

The cooler for a belt type stageless transmission is disclosed in Japanese Patent Publication Laid-Open No. 109762/1983, for example.

In such conventionally known coolers, a centrifugal fan is provided integrally on the back surface of a variable diameter pulley of a belt type stageless transmission, so that the open air is introduced into a transmission casing by the centrifugal fan to cool the transmission. However, heated portions such as a contact portion of the variable diameter pulley with a transmitting V-belt are not sufficiently cooled by only the centrifugal fan and thus, an intended cooling effect cannot be achieved.

In addition, to cool the interior of the transmission chamber of the transmission, it is a conventional practice to introduce the open or outside air into the transmission chamber through an air intake port opened in the front portion of the transmission casing and to discharge it through an air exhaust port opened in the rear portion of the transmission casing. In this case, the air flowing along the lower surface of the transmission casing and entraining water, mud, dust or the like therein may enter the transmission chamber through the air exhaust port, or the air may be drawn in the vicinity of the exhaust port to obstruct the smooth exhaust flow of the cooling air in the transmission chamber.

Further, where the transmission chamber containing the stageless transmission therein is disposed on one side of an engine body adjacent thereto, the combustion heat from the engine body may be transferred to the transmission casing to raise the temperature within transmission casing. Thus, the stageles transmission may be thermally damaged, and its service life disadvantageously shortened.

SUMMARY OF THE INVENTION

The present invention has been accomplished with the above circumstances in mind. The object of the present invention to provide a cooler for a belt type stageless transmission having a simple arrangement, wherein a sufficient amount of the cool open air is fed to heated portions of the belt type stageless transmission and the heat from the engine body may be prevented from being transferred to the transmission. Thus an intended cooling effect can be achieved.

To accomplish the above object, according to a first aspect of the present invention, there is provided a cooler for a belt type stageless transmission in a vehicle. The vehicle includes a transmission casing provided on one side of an engine body and a belt type stageless transmission for operatively connecting a crank shaft of the engine body and an output shaft supported in the transmission casing. A centrifugal fan for sucking the open air into the transmission casing is provided on either one of a pair of pulley halves of a variable diameter pulley of the transmission. An axial flow fan for guiding the cooling air in the axial direction of the variable diameter pulley is provided on the other pulley half.

According to a second aspect of the present invention, and air intake port is provided in the front portion of the transmission casing and an air exhaust port is provided in the rear portion thereof. A guide plate for guiding the air flowing along the lower surface of the transmission casing so as to peel it off from the lower surface is provided on the rear portion of the transmission casing below the air exhaust port.

According to a third aspect of the present invention, an air induction passage through which the running air can flow is defined between the engine body and the transmission casing.

With the above arrangements, since a centrifugal fan for sucking the open air into the transmission casing is provided on either one of a pair of pulley halves of a variable diameter pulley of the transmission, and an axial flow fan for guiding the air drawn in by the centrifugal fan in the axial direction of the variable diameter pulley is provided on the other pulley half, the cool air can rapidly flow around substantially the entire periphery of the variable diameter pulley. In this way the cooling of the variable pulley is effected over a wider area thereof, thus making it possible to enhance the effect of cooling the heated portions such as the contact portion of the pulley with the V-belt and to substantially improve the efficiency of cooling the variable diameter pulley of the belt type stageless transmission on the whole.

In addition, since an air intake port is provided in the front portion of the transmission casing and an air exhaust port is provided in the rear portion thereof, and since a guide plate for guiding the air flowing along the lower surface of the transmission casing to peel off the air flow from the lower surface is provided on the rear portion of the transmission casing below the air exhaust port, the air entraining water, mud, dust or the like therein and flowing along the lower surface of the transmission casing cannot be drawn to the rear surface of the transmission casing. Further, the air running below the casing cannot reverse flow to enter the transmission chamber or provide back pressure to slow the air flowing through the transmission casing. Thus, the smooth Operation of the transmission, is insured. Further, it is possible to extend the life of the individual parts of the transmission and to substantially improve the efficiency of cooling the transmission by the smooth flow of the cooling air.

Further, since an air induction passage through which the running air can flow is defined between the engine body and the transmission casing, a heat insulating air layer is formed in the air passage by the cool air. This reduces the transfer of the combustion heat of the engine body to the transmission casing to inhibit the rise in temperature of the engine oil within the engine body and the stageless transmission in the transmission casing. Thus it is possible to extend the life of the stageless transmission, particularly the V-belt and to prevent the deterioration of the engine oil.

The above and other objects, features and advantages of the present invention will become apparent from the following description of a preferred embodiment taken in conjunction with the accompanying drawings:

DESCRIPTION OF THE PREFERRED EMBODIMENTS

Figure 1:
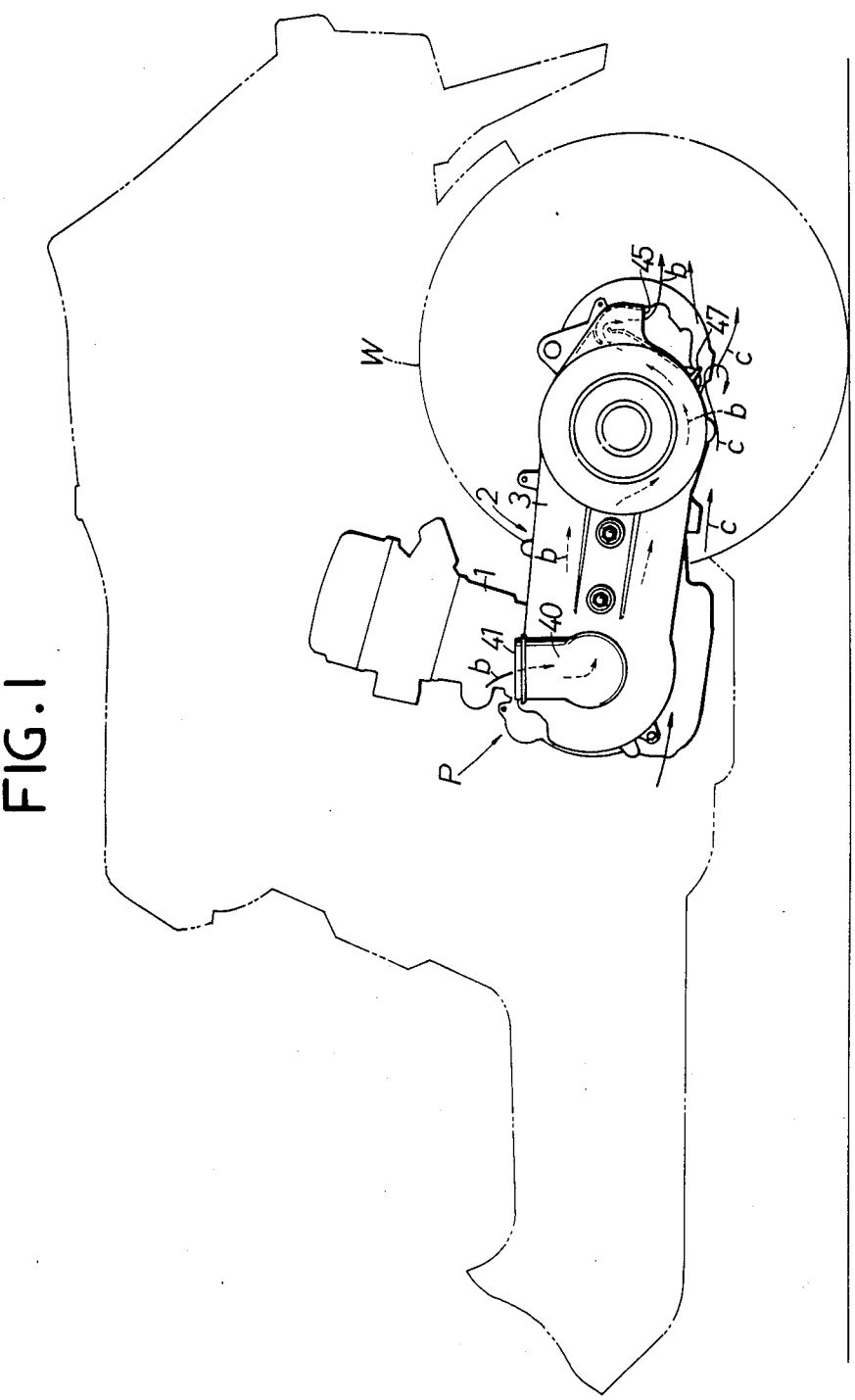
FIG. 1 is a side view of a transmission.

The present invention will now be described by way of an embodiment in which a cooler for a belt type stageless transmission in vehicles according to the present invention is applied in a motorcycle power unit.

A power unit P is suspended on a motorcycle body, and comprises an engine body 1, a power transmitting portion 2 provided adjacent the lower portion of the body 1 on one side thereof and a rear wheel W supported on the rear portion of the transmitting portion 2.

The transmitting portion 2 extends rearward from the lower portion of the engine body 1 and has a transmission casing 3 which is constituted of an outer wall $4_1$ of a crank casing 4, a transmission cover 5 secured to the rear portion of the outer wall by a connecting bolt 7, and a cover case 6 secured to the outer surfaces of the outer wall $4_1$ and the transmission cover 5 by connecting bolts 8 through an elastic sealing member 30.

A crank chamber 9 forming a part of the engine body 1 is defined in the front portion of the crank casing 4, and a transmission chamber 10 is defined in the transmission casing 3 adjacent the crank chamber 9. A crank shaft 11 is rotatably provided transversely in the crank chamber 9 and has a crank pin to which a piston slidably fitted in a cylinder 13 of the engine body 1 is connected through a connecting rod 12. A gear chamber 15 is defined in the rear portion of the transmission casing 3 by the rear portion of the outer wall $4_1$ of the crank casing 4 and the transmission cover 5, and an output shaft 16 is rotatably provided through the gear chamber 15 in parallel with the crank shaft 11.

A V-belt type stageless transmission T is disposed in the transmission chamber 10 of the transmission casing 3 and stretched around the crank shaft 11 and the output shaft 16. The description will now be made of the structure of the transmission T.

A variable diameter drive pulley 17 is mounted on one end of the crank shaft 11, and a driven pulley 18 having a variable diameter larger than that of the drive pulley 17 is also mounted on one end of the output shaft 16. An endless V-belt 19 is stretched around these pulleys 17 and 18. The drive pulley 17 is comprised of a stationary drive pulley half $17_1$ secured to the crank shaft 11 and a movable drive pulley half $17_2$ axially slidably carried on the crank shaft 11. The movable drive pulley half $17_2$ is provided with a shifting weight roller 20 adapted to receive a centrifugal force to move the movable drive pulley half $17_2$ toward the stationary drive pulley half $17_1$. The driven pulley 18 consists of a stationary driven pulley half $18_1$ secured to a hollow pulley shaft 21 rotatably carried on the output shaft 16 and a movable driven pulley half $18_2$ carried on the pulley shaft 21 for axial sliding movement. The movable driven pulley half $18_2$ is biased toward the stationary driven pulley half $18_1$ by a spring 22.

An automatic starting centrifugal clutch C is mounted on the output shaft 16 on the outer side of the driven pulley 18. The clutch C has a conventionally known structure, so that the pulley shaft 21 is connected to the output shaft 16 through the clutch C when the speed of rotation of the pulley shaft 21 exceeds a set value.

A reduction gear mechanism R is incorporated in the gear chamber 15 defined by the rear portion of the outer wall $4_1$ of the crank casing 4 and the transmission cover 5. The output shaft 16, a reduction shaft 24 and a wheel axle 25 rotatably extend transversely in the gear chamber 15 in parallel with one another. A drive gear 26 integral with the output shaft 16 is meshed with a first reduction gear 27 integral with the reduction shaft 24, and a second reduction gear 28 is meshed with a third reduction gear 29 integral with the wheel axle 25. The wheel axle 25 has a half projecting outside the gear chamber 15, and the rear wheel W is securely mounted on the projecting half. Therefore, when the operation of the engine body causes the crank shaft 11 to be rotated, this rotative movement is transmitted through the V belt type stageless transmission T and the centrifugal clutch C to the output shaft 16 and further through the reduction gear mechanism R to the rear wheel W.

An alternating current generator A is connected to the end of the crank shaft 11 which is on the opposite side of the stageless transmission T.

Figure 2:
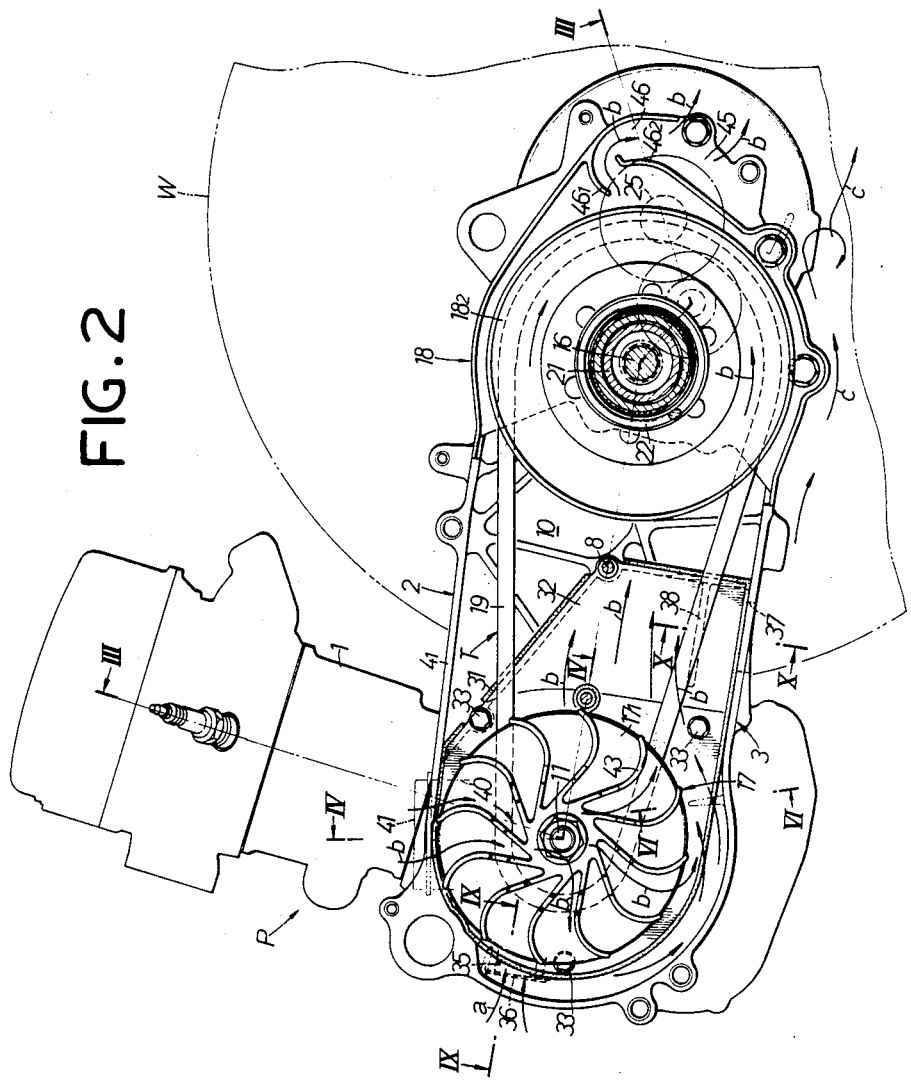
FIG. 2 is a sectional view taken along the line II—II of FIG. 3 illustrating a principal portion of the transmission.
Figure 3:
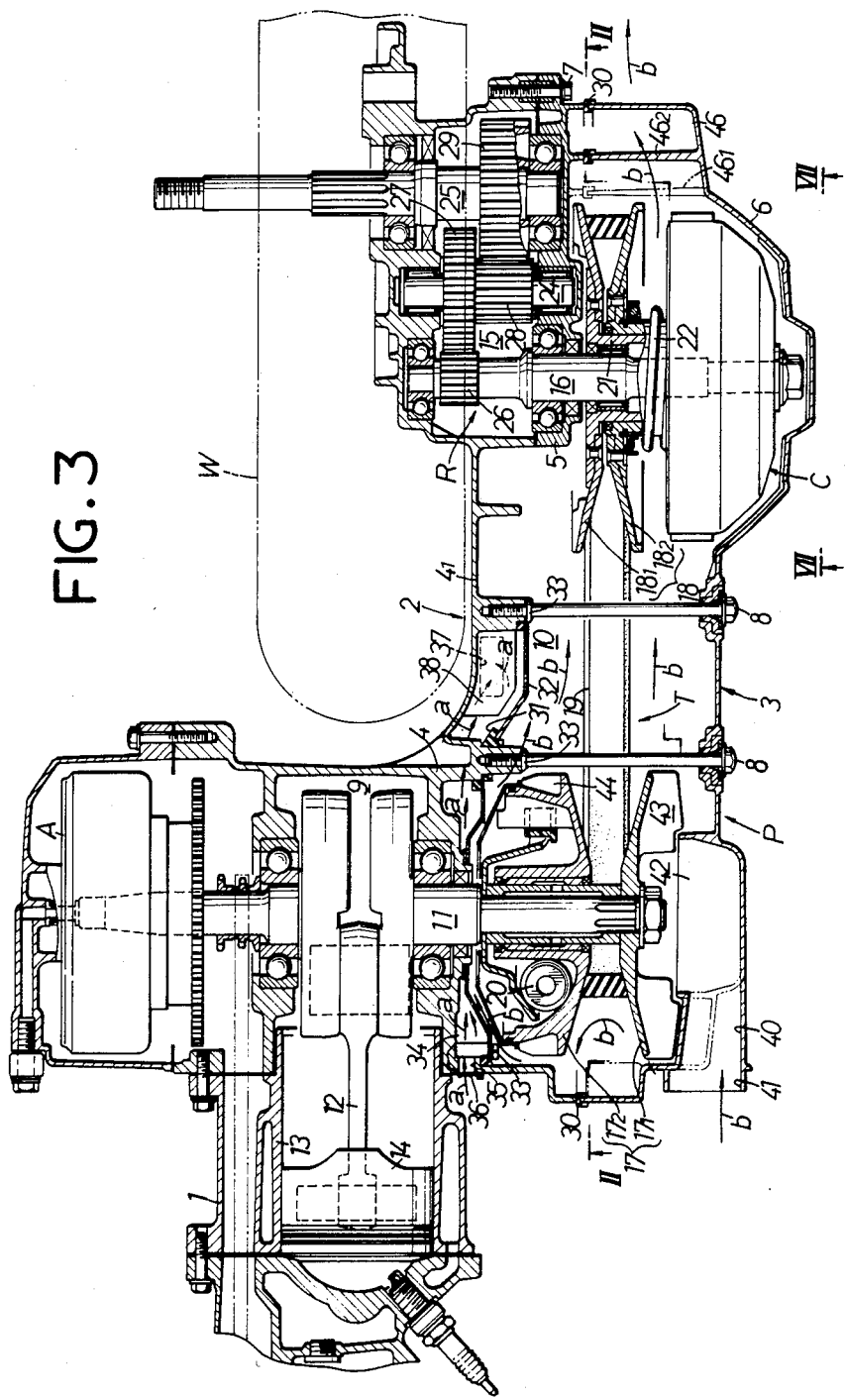
FIG. 3 is a sectional view taken along the line III—III of FIG. 2.

Referring to FIGS. 2 and 3, a heat insulating plate 32 is secured on the outer surface of the outer wall $4_1$ of the crank casing 4 by a plurality of mounting bolts 33 with a resilient seal member 31 interposed therebetween. The plate 32 partially defines the transmission chamber 10 and is opposed to the back surface of the movable drive pulley half $17_2$ of the stageless transmission T. The heat insulating plate 32 also defines a longitudinally long air induction passage 34 between the transmission chamber 10 and the crank chamber 9 in cooperation with the outer wall $4_1$ of the crank casing 4. As shown in FIG. 3, an air inlet port 35 is opened in communication with the air passage 34 in the front wall of the crank casing 4, and a filter 36 is mounted in front of the air inlet port 35. As shown in FIGS. 2 and 3, an air outlet port 37 is also opened in communication with the air passage 34 in the bottom of the outer wall $4_1$ of the crank casing 4 under the rear portion of the air passage 34. An air outlet wall 38 is provided integrally with the outer wall $4_1$ of the crank casing 4 above the air outlet port 37 to extend substantially horizontally therefrom. The air outlet wall 38 hangs over the air outlet port 37 to prevent water, mud, dust or the like from entering the air passage 34. Therefore, when the vehicle travels, a part of the running air impinging against the front wall surface of the crank casing 4 flows into the air passage 34 through the air inlet port 35 and passes rearward through the air passage 34 as shown by an arrow a in FIGS. 2 and 3, and thereafter, is discharged outside through the air outlet port 37. This causes a heat insulating air layer consisting of cool air to be formed between the crank chamber 9 and transmission chamber 10, so that heat generated from the operation of the engine body 1 well not all be transferred to the transmission chamber 10 and thus the stageless transmission T.

Provided in the transmission casing 3 is a cooler means adapted to suck the cool open air into the transmission casing 3 and positively guide it around the periphery of the stageless transmission T, thereby effectively cooling the heated portions of the transmission T. The description will now be made of the structure of this cooler means.

Figure 4:
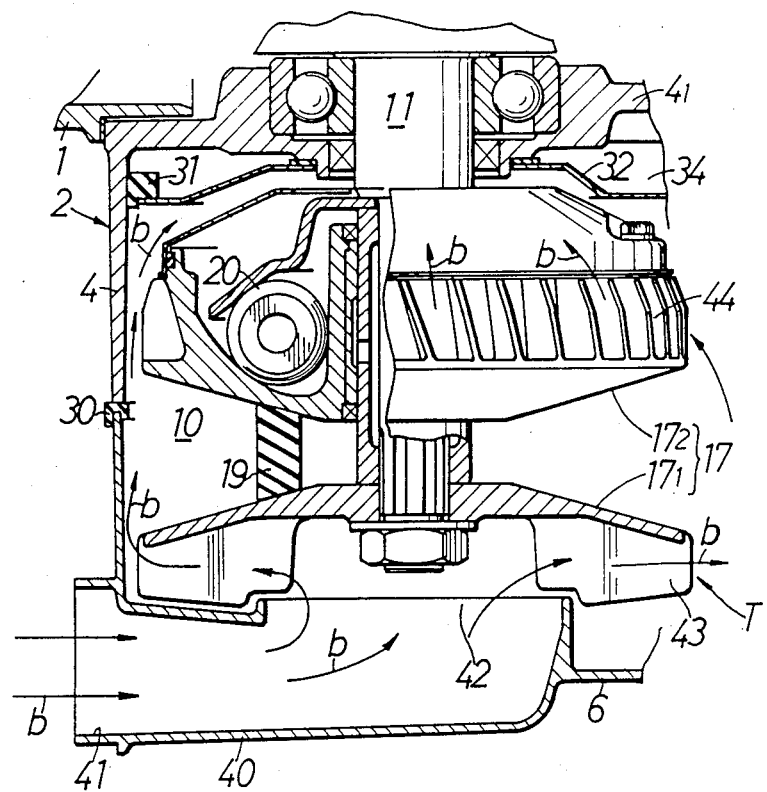
FIG. 4 is a sectional view taken along the line IV—IV of FIG. 2.

As clearly shown in FIGS. 1, 3 and 4, the cover case 6 is formed at its front side integrally with an air intake duct 40 having an air intake port 41 which is opened above the front portion of the cover case 6. The air intake duct 40 also has an outlet port 42 which is opened in the transmission chamber 10 and opposed to the central back surface of the drive pulley 17.

As clearly shown in FIG. 4, a centrifugal fan 43 is integrally formed on the back surface of the stationary drive pulley half $17_1$ of the drive pulley 17, and an axial flow fan 44 is integrally formed on the outer peripheral surface of the movable drive pulley half $17_2$. The centrifugal fan 43 sucks the open air into the transmission chamber 10 through the air intake duct 40, and the axial flow fan 44 guides the air sucked in by the centrifugal fan so that the air flows in the axial direction thereof.

Figure 5:
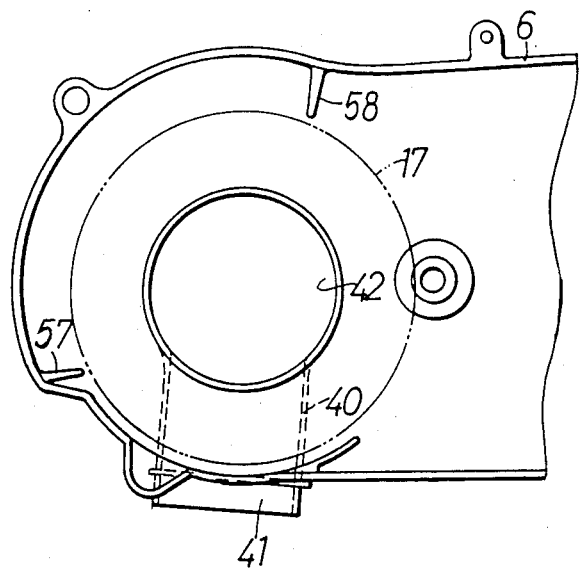
FIG. 5 is a rear view of a part of a casing cover, taken along the line V—V of FIG. 3.
Figure 6:
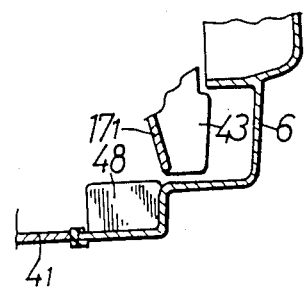
FIG. 6 is partial, sectional view along the line VI—VI of FIG. 2.

Referring to FIG. 5, several guide plates 57 and 58 are formed integrally on the inner surface of the cover case 6, circumferentially spaced apart from one another, and are protruded opposed to the outer peripheral surface of the drive pulley 17. These guide plates 57 and 58 guide the flow of the open air produced by the axial flow fan 44 to divert it in the axial direction of the drive pulley 17.

As shown in FIGS. 2, 3, 7 and 8, an air exhaust port 45 is opened in the rear wall of the cover case 6 behind the driven pulley 18, and a bypass duct 46 is defined just in front of the exhaust port 45 by several buffers $46_1$ and $46_2$.

Figure 7:
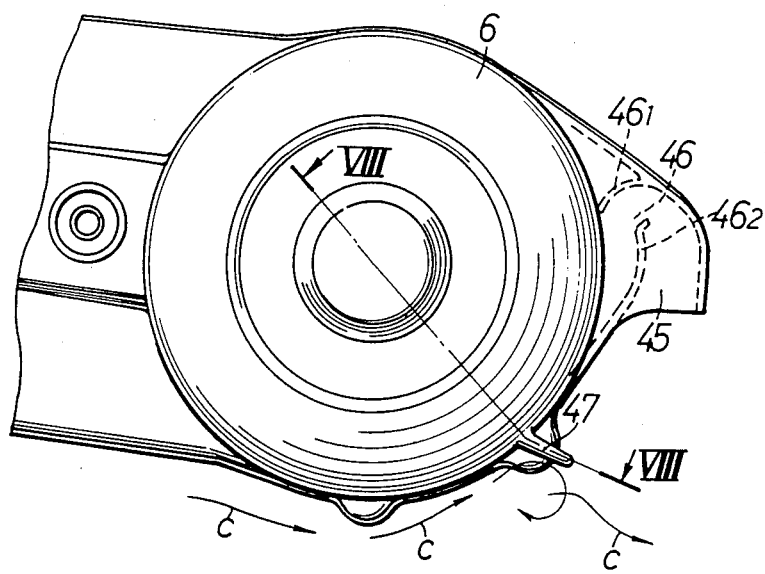
FIG. 7 is a side view of a part of the casing cover, taken along the line VII—VII of FIG. 3.
Figure 8:
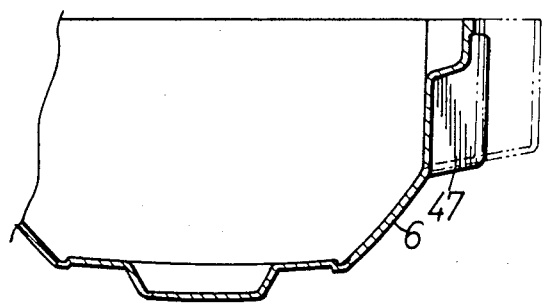
FIG. 8 is a sectional view along the line VIII—VIII of FIG. 7.
Figure 9:
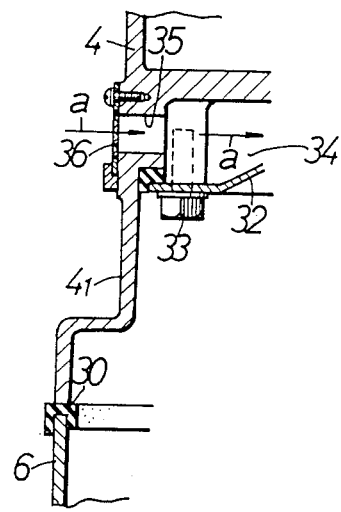
FIG. 9 is a sectional view along the line IX—IX of FIG. 2.
Figure 10:
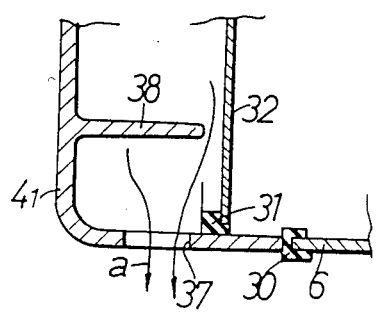
FIG. 10 is a sectional view along the line X—X of FIG. 2.

As clearly shown in FIGS. 7 and 8, a guide plate 47 for the running air is formed on the rear surface of the cover case 6 to extend rearward and slightly downward. The guide plate 47 peels off the running air flowing along the lower surface of the transmission casing 3 therefrom to guide it so that it flows downward as indicated by an arrow c in FIGS. 1, 2 and 7.

The operation of the embodiment of the present invention will now be described.

In operation, if the engine is operated, the rotation of the crank shaft 11 is transmitted to the rear wheel W through the V-belt type stageless transmission T and the centrifugal clutch C, so that the gear ratio is automatically controlled depending upon the throttle operation and the travelling condition of the vehicle in a usual manner.

During travelling of the vehicle, a part of the cool running air impinging against the front surface of the transmission casing 3 is guided through the air inlet port 35 including the filter 36 into the air passage 34, as indicated by the arrow a in FIGS. 2 and 3, and passed rearward through the air passage 34 and then discharged outside through the air outlet port 37. Thus, the cool air flowing in the air passage 34 forms a heat insulating air layer between the crank chamber 9 of the engine body 1 and the transmission chamber 10 containing the stageless transmission T therein. The air layer acts in cooperation with the heat insulating effect of the heat insulating plate 32 to reduce to the utmost the transfer of the heat emitted by the engine to the transmission chamber 10 from the engine body 1 and to inhibit the increase in temperature in the transmission chamber 10 due to the combustion heat of the engine.

In addition, upon the rotation of the drive pulley 17 as indicated by an arrow b in FIGS. 1 to 4, te centrifugal fan 43 behind the stationary drive pulley half $17_1$ sucks the open air into the transmission chamber 10 through the air intake duct 40, and the axial flow fan 44 around the outer periphery of the movable drive pulley half $17_2$ causes the cool air sucked in the transmission chamber 10 to flow in the axial direction of the drive pulley 17 along the outer periphery thereof while being guided by the guide plates 47 and 48. The air flowing along the outer periphery of the movable drive pulley half $17_2$ is diverted toward the back surface of the pulley half $17_2$ to cool the latter satisfactorily. Then, such air flows rearwardly in the transmission chamber 10 along the stageless transmission T to also cool the rear half of the transmission T including the driven pulley 18 and thereafter, is released outside through the bypass duct 46 and the exhaust port 45. Thus, the driven pulley 18, particularly its movable driven pulley half $18_2$, which is in close vicinity to the engine body 1 and is easily heated, is efficiently cooled with a sufficient amount of the rapidly flowing cool air.

The laminar flow of the air flowing along the lower surface of the transmission casing 3 as indicated by the arrow c in FIGS. 1 and 7 due to travelling of the vehicle impinges against the guide plate 47 to become a turbulent flow and thus, is peeled off from the lower surface of the transmission casing to flow downward. Therefore, the air flowing below the transmission casing 3 and with water, mud, dust or the like entrained therein can not be raised along the rear wall of the transmission casing 3, and such water, mud, dust or the like does not reverse and flow into the transmission chamber 10 through the air exhaust port 45, and the flow of the cooling air flowing in the transmission chamber 10 is not disturbed thereby.

What is claimed is:

1. A cooler for a belt type stageless transmission in a vehicle in which a transmission casing is provided on one side of an engine body, and a belt type stageless transmission for operatively connecting a crank shaft of said engine body and an output shaft supported in said transmission casing is housed in said transmission casing, wherein a centrifugal fan for sucking open air into said transmission casing is provided on either one of a pair of pulley halves of a variable diameter pulley of said transmission, and an axial flow fan for guiding the air drawn in by said centrifugal fan in an axial direction of said variable diameter pulley is provided on the other pulley half.

2. A cooler for a belt type stageless transmission in a vehicle in which a transmission casing is provided on one side of a engine body, and a belt type stageless transmission for operatively connecting a crank shaft of said engine body and an output shaft supported in said transmission casing is housed in said transmission casing, wherein an air intake port is provided in a front portion of said transmission casing and an air exhaust port is provided in a rear portion thereof, and an exterior guide plate for guiding air flowing along a lower surface of said transmission casing so as to peel the air flow off from said lower surface is provided on the rear portion of said transmission casing below and spaced from said air exhaust port.

3. A cooler for a belt type stageless transmission in a vehicle in which a transmission casing is provided on one side of an engine body, and a belt type stageless transmission for operatively connecting a crankshaft of said engine body and an output shaft supported in said transmission casing is housed in said transmission casing, wherein an air induction passage through which running air flows is defined between said engine body and said transmission casing, and said transmission casing has an air intake port in a front portion thereof and an exhaust port in a rear portion thereof for guiding outside air through the air intake port into an interior of said casing and allowing the induced air to be discharged outside from the air exhaust port, and wherein said air induction passage is separated from the interior of the transmission casing connecting the air intake and exhaust ports.

4. A cooler for a belt type stageless transmission for a vehicle having a transmission casing and a variable diameter pulley with two pulley halves, comprising
a centrifugal fan on one of the two pulley halves;
an inlet through said transmission casing directed to said centrifugal fan;
an axial flow fan provided on the other of the two pulley halves.

5. The cooler of claim 4 further comprising an exhaust port through the transmission casing spaced from said inlet.

6. The cooler of claim 5 further comprising an exterior guide plate on the outside of the transmission casing below and spaced from said exhaust port, said exhaust port being at the back of said transmission casing.

7. The cooler of claim 3 wherein said air induction passage and said interior of the transmission casing are separated by a wall formed of a heat insulating plate.

8. The cooler of claim 1 wherein said pair of pulley halves include an axially stationary pulley half remote from the engine body and an axially movable pulley half close to the engine body, said centrifugal fan being provided on the stationary pulley half and said axial flow fan being provided on the movable pulley half.

9. The cooler of claim 1 further comprising interior guide plates protruding inwardly on an inner wall of the transmission casing about said variable diameter pulley, said plates being oriented transversely to circumferential movement of said pulley.

10. The cooler of claim 1 further comprising an inlet provided through the transmission casing at a position facing the centrifugal fan.

11. The cooler of claim 2 wherein said exterior guide plate is disposed projecting rearwardly and downwardly.

12. The cooler of claim 11 wherein said air exhaust port has an opening directed downward.

13. The cooler of claim 3 further comprising an air inlet port and an air outlet port for said air induction passage.

* * * * *